March 22, 1938.                J. I. LINER                2,111,934
SYNCHRONOUS MOTOR
Filed June 22, 1936

INVENTOR
Joseph I. Liner
BY
D. Henry Stoltenberg
ATTORNEY

Patented Mar. 22, 1938

2,111,934

UNITED STATES PATENT OFFICE 2,111,934

SYNCHRONOUS MOTOR

Joseph I. Liner, Toledo, Ohio, assignor to The Electric Auto-Lite Company, Toledo, Ohio, a corporation of Ohio Application June 22, 1936, Serial No. 86,577

7 Claims. (Cl. 172—278)

This invention relates to self-starting synchronous motors, more particularly to motors having masses of conducting matter, such as copper or the like, associated with the rotor to create a starting torque at the edge of a shifting magnetic field to revolve the rotor to synchronous speed or thereabove so that it may fall into step with the shifting field to rotate at synchronous speed.

This invention provides a starting device for an alternating-current synchronous motor in which the rotor is fitted with a plate or plates of conducting material in which there is induced a starting torque when the rotor is positioned near the outside of the magnetic field as created by a bi-polar field structure or the like. The field poles are shaded in a well known manner to create a shifting field for starting purposes, so that the rotor may revolve at a speed above synchronous speed to fall into step through the interaction of the salient poles of the rotor and the field poles. The rotor is initially positioned at a point near the edge of the magnetic field which will substantially nullify the locking effect of the salient poles and allow torque created by the eddy currents in the conducting plates of the rotor to revolve the rotor.

As the rotor accelerates, it is slowly moved from the position at the edge of the magnetic field into alignment with the field pieces where the least reluctance is presented to the magnetic flux, the speed having in the meantime increased to synchronous speed or slightly thereabove. The magnetic flux at this time will tend to decelerate the rotor by seeking a magnetic path of least reluctance through the rotor to align the salient poles of the rotor and the field pieces at times when the flux density is a maximum. This condition is fulfilled at synchronous speed. Upon termination of the field, the rotor is returned to the initial position at the edge of the magnetic field for another starting cycle.

It is, therefore, an object of this invention to provide a self-starting synchronous motor, especially adapted for use with timing devices such as electric clocks and the like in which the rotor has salient poles for synchronous rotation in a shifting magnetic field and an eddy current structure for creating starting torque, the rotor being initially positioned relatively distant from the center of the magnetic field so that the locking effect of the salient poles may be relatively small and the starting torque of the eddy current structures comparatively large, that the rotor may be revolved thereby and slowly moved into alignment with the field poles to give the flux of the magnetic field the path of least reluctance and cause the rotor to fall into step with the shifting field for operation at synchronous speed.

It is a further object of this invention to provide a self-starting synchronous motor with a rotor that is shiftable axially and provided with salient teeth for synchronous operation and with eddy current structures for creating starting-torque.

It is a further object of this invention to provide a self-starting synchronous motor having a rotor which is shiftable axially from a point near the edge of a magnetic field produced by field poles to a point where it is in alignment with the field poles to overcome the initial locking effect of the salient poles during starting and to provide freedom of movement to effectuate a starting-torque induced by eddy currents to rotate the rotor.

It is a further object of this invention to provide a slow-speed self-starting synchronous motor which is cheap to manufacture for fabrication and durable for continued use.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1:
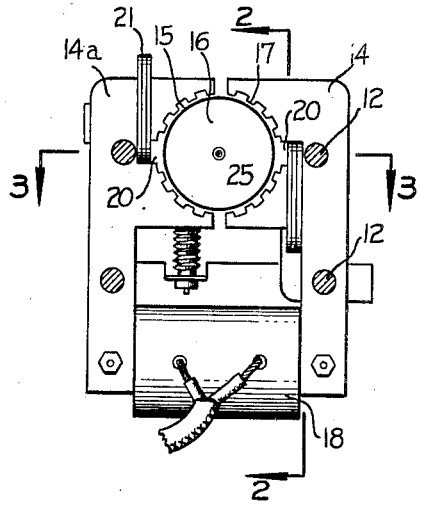
Figure 1 is an elevation, partly in section, of the invention looking along the rotor axle with the front frame member removed.

Referring to the drawing, there are provided two frame members 10 and 11 which are held in spaced relation by means of studs 12, provided with pins 13 for mounting. Suspended upon the studs 12, at the position intermediate the frame members 10 and 11, there are provided two laminated field pieces 14 and 14a made of suitable magnetic material and held rigidly in position upon the studs in any convenient manner. The field pieces 14 and 14a are positioned in cooperative spaced relation with each other to provide a cylindrical space 15 between them suitable for cooperation with a rotor 16. The space 15 is surrounded by a series of salient poles or teeth 17 formed in part of the laminae of the field pieces 14 and 14a. The remainder of the laminae may be cut away to isolate the salient poles 17 so that the magnetic flux, which is generated by a field coil 18, may be concentrated at the tips of the poles 17. The field coil 18 is designed to suit the characteristics of an electric source of power with which it is placed in circuit, and is positioned upon a laminated cross member 19, adapted to bridge the ends of the field pieces 14 and 14a so as to give a complete magnetic circuit.

The field pieces 14 and 14a are provided with notches 20 symmetrical with the space 15 in which are mounted shading coils 21 made of copper or the like to give the motor a desirable flux condition in the magnetic field. This construction is well known in the art and need not be described in further detail.

Figure 2:
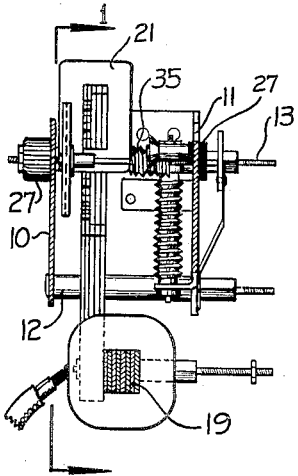
Figure 2 is an elevation, partly in section, lookin the direction of the arrow 2 of Figure 1 with one of the field poles removed.
Figure 3A:
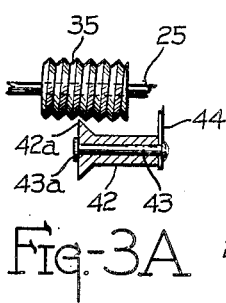
Figure 3a is an enlarged view partly in section of a detail.

A rotor 16, as described above, is adapted to cooperate with the field poles 14 and 14a in the space 15, the rotor being of such diameter that proper clearances are provided between the periphery of the rotor and the salient poles 17 of the field pieces. The rotor, whose details of construction will be described hereinafter, is fixedly mounted upon an axle 25 by means of mounting collar 26. The axle suspends the rotor in the space 15 by being journalled in bearings 27 positioned upon the frame members 10 and 11 so that the rotor will be held in alignment and with proper clearances with respect to the field pieces, and at the same time allow longitudinal movement of the axle to move the rotor to a position relatively distant from the field pieces. This end play of the axle is illustrated in Figure 2 which shows the rotor 16 out of alignment with the field pieces. The purpose of this construction is to supply proper magnetic conditions whereby torque may be applied to the rotor to revolve the same from a standstill to approximately synchronous speed as will be described hereinafter.

The rotor 16 is provided with a central disc 30 having salient poles 31 in the same proportion as the salient poles 17 upon the field pieces, so that the rotor may adapt itself to magnetic conditions during operation and revolve at a synchronous speed which varies, depending upon the characteristics of the source of electrical energy from which the motor is being operated and the ratio between the cooperating salient poles. The central disc 30 of the rotor is made of magnetic material. On each side of the central disc, there is provided a disc of non-magnetic conducting material 32, such as copper or the like, which is fastened thereto in any convenient manner as; for example, by brazing. The outside diameters of the plates 32 are substantially equal to that of the inner plate 30. In the construction shown in Figures 1 to 6, bridging members 33 of non-magnetic conducting material are provided to connect the plates 32 together somewhat in the nature of a squirrel-cage winding. If it is desirable, the plates 32 and the bridging members 33 may be made integral.

The rotor 16 provides power to drive any suitable device such as a timing mechanism or the like. In order to accomplish this, there is mounted upon the axle 25, a worm 35 which cooperates with a worm gear 36 rotatably mounted upon a stub shaft 37, positioned in apertures in flanges 38 of the frame member 11. The stub shaft 37 may be employed to carry other power-transmitting members as; for example, the worm 39 which, in turn, may cooperate with a gear train of any design suitable for operating a device which the motor is designed to drive. This construction is well known in the art and may be of any proper design.

As pointed out above, the axle 25 is shiftable axially so as to allow the rotor 16 to be displaced from alignment with the field poles 14 and 14a. This displacement is desirable so that a novel starting mechanism may be provided to cooperate with the rotor. If, at the time of starting, the rotor was aligned with the field pieces, the magnetic flux would set up a path through the central disc 30 of the rotor and lock the rotor in position so that no torque would be produced to operate the gear train. The shading poles 21 provide a shifting field which has a tendency to cause rotation but they are inadequate to overcome this locking effect of the magnetic flux. In order that the shifting magnetic field may have an opportunity to rotate the rotor, the rotor 16 is displaced from center of the field so that the shifting field may have an opportunity to act upon the plate or plates 32 of the rotor to create a torque. For this reason, the rotor is shifted axially from alignment with the field poles.

If the rotor were allowed to maintain its position outside the alignment of the field poles, it would rotate at a speed which would be somewhat indeterminate and would, therefore, be useless to drive a mechanism which required uniform speed as, for example, the timing mechanisms mentioned above. However, with the construction disclosed, once the rotor is moving near synchronous speed, in alignment with the field poles, it will continue to operate at synchronous speed without variation. The salient pole construction allows rotation of the rotor at only one speed; namely, synchronous speed. A slight variation may be allowable provided the rotor can correct the variation and pull the rotor back into step at synchronous speed without falling out of step. It is, therefore, necessary to place the rotor in a position displaced from the field poles at starting so that the torque induced by the shifting field may cause rotation at some indeterminate speed at or above synchronous speed and then allow the rotor to move slowly into alignment in the field for operation at synchronous speed.

When the rotor is at rest and the coil 18 is disconnected from the source of electrical energy, the rotor is substantially in the position shown in Figure 2, that is, the rotor is displaced from alignment with the field pieces 14 and 14a. To hold the rotor in this initial position, a resilient means or spring 40 is provided, which is preferably a leaf spring, one end of which is anchored to the frame member 11 in any convenient manner, as by perforating the same for cooperation with one of the studs 12, and the other free end of the spring 40 is provided with a rub block 41 of any suitable material fastened thereto in any convenient manner as by riveting or the like. The rub block 41 is placed in cooperative relation with an end 25a of the axle 25 and adapted to bear thereon at all positions of the axle to urge the axle toward the initial position at all times. The strength of the spring 40 must be adequate to fulfill its function in returning the rotor to the starting position and at the same time allow comparatively free movement of the rotor under influence of the magnetic field created by the coil 18.

To prevent the magnetic field from pulling the rotor 16 directly to the center of the field with a simple axial movement, there is provided a fixed point means, preferably a roller 42 to cooperate with the worm 35, the roller having a frustoconical section 42a, the peripheral edge of the base of this section riding in the bottom of the V-groove of the worm and thereby allowing the rotor to advance into the center of the magnetic field under the pull of the flux only after completing the number of revolutions necessary to cause the peripheral edge of the frusto-conical section to advance to the end of the worm. In this way, the rotor is allowed to enter the field in a time interval that is controlled by its own speed of rotation and the pitch of the worm.

Figure 4:
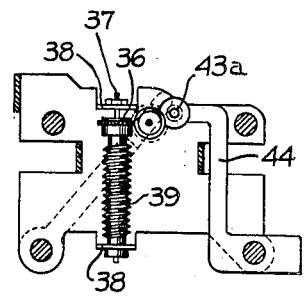
Figure 4 is an elevation taken along the line 4—4 of Figure 3.
Figure 3:
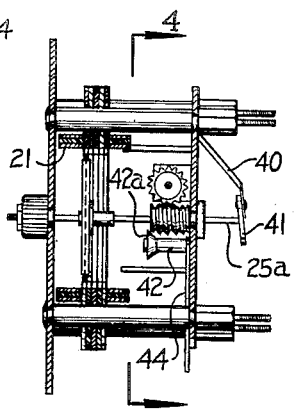
Figure 3 is a plan view partly in section taken along the line 3—3 of Figure 1.
Figures 5, 6:
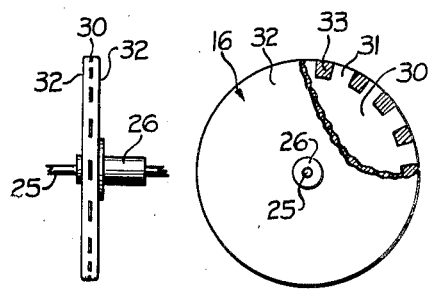
Figure 5 is an elevation of the rotor, partly in section.
Figure 6 is a plan view of the rotor.

The roller 42 is mounted to present resistance to movement of the rotor when the rotor is moved to the right (Figure 2) by being buttressed against the frame member 11, but allowing free movement of the rotor when the rotor is being moved to the left, as; for example, by the bias of the spring 40. This is accomplished by journalling the roller 42 for free rotation on a stud 43 riveted into the free end of a comparatively flexible leaf spring 44. The stud 43 is provided with a head 43a to hold the roller 42 in position. As shown in Figure 4, the spring 44 is in the general form of the letter Z, the free branch of which carries the roller, the other being anchored to the frame member 11 in any convenient manner, as; for example, by being perforated and threaded between the stud 12 and the frame member. The spring 44 is in parallel juxtaposition with the frame member 11 and is forced into close contact therewith to buttress the roller 42 under the conditions mentioned above, but may be widely separated therefrom by flexing about the anchor point to allow the roller 42 to be displaced so that the rotor movement will be comparatively unimpeded when influenced by the spring 40. With the rotor in alignment with the field pieces, the roller 42 is free from the worm 35.

The operation of the motor is as follows: The rotor is initially in position as shown in Figure 2, the axle 25 being biased by the spring 40 to hold the rotor in a position relatively distant from the center of the field. At this time, the peripheral edge of the base of the frusto-conical section 42a of the roller is in contact with the V-groove of the worm 35. Then the coil 18 is connected with a proper source of alternating current to energize the pole pieces 14 and 14a to create a magnetic field between them. The shading coils 21 dephasing a portion of this field to create a starting torque in the rotor. The rotor is being strongly attracted into the center of the field against the bias of the spring 40 into alignment with the field pieces by the pull of the magnetic field on the magnetic material of the rotor, but is retarded by the interaction between the roller 42 and the worm 35. As the rotor begins to revolve, the roller 42 allows it to advance slowly into the center of the field, by advancing the worm 35 with respect to the fixed point on the roller 42, which is buttressed against the frame member 11 to sustain the force on the rotor due to the magnetic attraction of the field. As the rotor advances into the center of the field, the flux density, creating a torque, increases, and the torque is augmented proportionally which, in turn, causes the rotor to revolve more rapidly. At the same time, as the center of the field is approached, the magnetic interaction between the salient poles 17 on the field pieces and the salient poles 31 on the rotor increases and when actual alignment is attained between the rotor and the field pieces, there is a tendency to decelerate the rotor and force it to fall into step at synchronous speed. The motor will continue to run at this speed until the magnetic field is changed by an overload on the axle or by the cessation of energization. When the magnetic field ceases, the bias of the spring 40 will be sufficient to move the rotor back to the initial position for a new cycle of starting.

Figure 7:
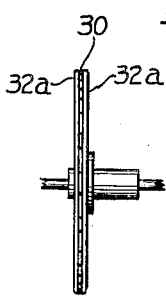
Figure 7 is a plan view of another modification of the rotor.

In Figure 7, a modification of the construction of the rotor is illustrated in which the bridging members 33 are removed and only two non-magnetic conductive plates 32a are positioned on opposite sides of the salient-tooth magnetic portion 30. If it is found desirable, both plates 32a may be mounted on one side of the rotor, the side adjacent the field pieces when the rotor is out of alignment therewith. Both plates may be made integral if desirable under these circumstances.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a self-starting synchronous motor, field members for producing a shifting magnetic field, a rotor adapted to rotate in the field at synchronous speed, axle means to allow the rotor to shift from an initial position near the limits of the magnetic field to an operable position near the center of the field, squirrel-cage windings on the rotor to create torque for revolving the rotor from a standstill to synchronous speed, resilient means cooperating with the axle means to hold the rotor in the initial position, worm means on the axle means, brush means cooperating with the worm means to allow the rotor to be advanced into operable position in the center of the field by having the brush means contact the inclined plane of the worm, the brush means being ineffective to restrain the effort of the resilient means to return the rotor to the initial position.

2. In a self-starting synchronous motor, means for producing a rotating field, rotor means adapted to rotate in the field, the rotor means having a portion with strong starting characteristics and a portion with strong synchronous characteristics, shiftable axle means for the rotor means, resilient means cooperating with the axle means for displacing the rotor means near the limits of the field at the termination of the field, screw means on the axle means, brush means to cooperate with the ramp of the screw means to control the movement of the rotor means from the limits of the field to the center of the field upon initiation of the field to allow the rotor means to move into operable position in the center of the field after the rotor means has turned a predetermined number of revolutions.

3. In a self-starting synchronous motor, means for producing a rotating field, rotor means adapted to rotate in the field, the rotor means having a portion with strong starting characteristics and a portion with strong synchronous characteristics, shiftable axle means for the rotor means for displacing the rotor adjacent the limits of the field at the termination of the field, positively-actuated means for inhibiting the movement of the rotor means from the limits of the field to the center of the field upon initiation of the field, said positively-actuated means allowing the rotor means to enter the center of the field from the limits of the field after a pre-determined number of revolutions of the rotor means.

4. In a self-starting synchronous motor, means for producing a rotating field, rotor means adapted to rotate in the field, the rotor means having a portion with strong starting characteristics and a portion with strong synchronous characteristics, shiftable means cooperating with the rotor means adapted to displace the rotor means to substantially the limits of the field at the termination of the field, means to restrain direct movement of the rotor means from the limits of the field to the center of the field at the initiation of the field but not interfering with the movement of the rotor means from the center of the field and allowing the rotor means to enter the center of the field only after rotating a predetermined number of revolutions.

5. In a self-starting synchronous motor, means for producing a rotating field, rotor means adapted to rotate in the field, the rotor means having a portion with strong starting characteristics and a portion with strong synchronous characteristics, shiftable means for the rotor means adapted to allow axial displacement of the rotor means to substantially the limits of the field, means to move the rotor means to the limits of the field, and means to retard positively the movement of the rotor means only when the rotor means is moving from the limits of the field to the center of the field but allowing the rotor means to enter the center of the field after rotating a predetermined number of revolutions.

6. In a self-starting synchronous motor, means for producing a rotating field, rotor means adapted to rotate in the field, the rotor means having a portion with strong starting characteristics and a portion with strong synchronous characteristics, shiftable means for the rotor means for displacing the rotor adjacent the limits of the field at the termination of the field, worm means cooperating with the shiftable means to drive a gear sequence, brush means cooperating with the worm means to inhibit the movement of the rotor means from the limits of the field to the center of the field at the initiation of the field, said brush means being ineffective to inhibit the movement of the rotor means to the limits of the field at the termination of the field.

7. In a self-starting synchronous motor, means for producing a rotating field, rotor means adapted to rotate in the field, the rotor means having a portion with a strong starting characteristic and a portion with strong synchronous characteristics shiftable axle means for the rotor means for displacing the rotor adjacent the limits of the field at the termination of the field, worm means cooperating with the axle means to drive a gear sequence, brush means cooperating with the ramp of the worm means to inhibit the movement of the rotor means from the limits of the field to operable position near the center of the field upon initiation of the field, the inhibiting action being effective for a predetermined number of turns of the rotor means.

JOS. I. LINER.